United States Patent
Harth et al.

(10) Patent No.: US 10,793,306 B2
(45) Date of Patent: Oct. 6, 2020

(54) SEALING STATION FOR SEALING OF FILM BAGS AND CORRESPONDING METHOD

(71) Applicant: INDAG Pouch Partners GmbH, Eppelheim (DE)

(72) Inventors: Rolf Harth, Neckargemund (DE); Frank Lechert, Weinheim (DE)

(73) Assignee: INDAG POUCH PARTNERS GMBH, Eppelheim (DE)

( * ) Notice: Subject to any disclaimer, the term of this patent is extended or adjusted under 35 U.S.C. 154(b) by 289 days.

(21) Appl. No.: 15/227,430

(22) Filed: Aug. 3, 2016

(65) Prior Publication Data
US 2017/0036796 A1 Feb. 9, 2017

(30) Foreign Application Priority Data
Aug. 7, 2015 (DE) .................................. 15180151

(51) Int. Cl.
 *B29C 65/02* (2006.01)
 *B65B 51/22* (2006.01)
 (Continued)

(52) U.S. Cl.
 CPC ............ *B65B 51/225* (2013.01); *B29C 65/08* (2013.01); *B29C 66/1122* (2013.01);
 (Continued)

(58) Field of Classification Search
 CPC ........... B29C 66/1122; B29C 66/43121; B29C 66/8221; B29C 66/8222; B29C 66/8246;
 (Continued)

(56) References Cited

U.S. PATENT DOCUMENTS

| 5,279,098 A * | 1/1994 | Fukuda | ............... B29C 66/8223 53/374.6 |
| 6,088,994 A * | 7/2000 | Nakagawa | .......... B29C 65/7817 53/374.6 |
| 2007/0084142 A1 * | 4/2007 | Matthews | ................. B65B 9/20 53/412 |

FOREIGN PATENT DOCUMENTS

EP     2597057 A1     5/2013

OTHER PUBLICATIONS

European Search Report, EP Application No. 15180151, dated Jan. 11, 2016, pp. 1-6.
(Continued)

*Primary Examiner* — Chelsea E Stinson
*Assistant Examiner* — Mary C Hibbert-Copeland
(74) *Attorney, Agent, or Firm* — Mayer Brown LLP

(57) ABSTRACT

The invention relates to a sealing station in a film bag filling device for sealing of film bags after a filling process, wherein the sealing station comprises a first and a second sealing arm for sealing of several filled film bags that are arranged next to one another, wherein the first sealing arm is moveable with a first drive shaft and the second sealing arm with a second drive shaft. A servo engine is disposed on the first drive shaft, and a drive movement of the first drive shaft from a first gear wheel is transferred to a second gear wheel that encroaches in the first gear wheel and from the second gear wheel to the second drive shaft. The invention further relates to a method for sealing of film bags after a filling process with the sealing station according to the invention with the following steps: positioning of filled film bags below the sealing station; closing of the sealing arms and application of a contact pressure with a first value and sealing of the filled film bags.

11 Claims, 3 Drawing Sheets

(51) Int. Cl.

| | |
|---|---|
| *B29C 65/00* | (2006.01) |
| *B65B 65/02* | (2006.01) |
| *B29C 65/08* | (2006.01) |
| *B65B 51/14* | (2006.01) |
| *B65B 9/00* | (2006.01) |
| *B29L 31/00* | (2006.01) |

(52) U.S. Cl.
CPC .. *B29C 66/43121* (2013.01); *B29C 66/81469* (2013.01); *B29C 66/8221* (2013.01); *B29C 66/8222* (2013.01); *B29C 66/8246* (2013.01); *B29C 66/83241* (2013.01); *B29C 66/849* (2013.01); *B29C 66/8432* (2013.01); *B29C 66/92615* (2013.01); *B29C 66/92921* (2013.01); *B65B 51/146* (2013.01); *B65B 65/02* (2013.01); *B29L 2031/7128* (2013.01); *B65B 9/00* (2013.01)

(58) Field of Classification Search
CPC .......... B29C 66/83241; B29C 66/8432; B29C 66/849; B29C 65/08; B65B 51/225
USPC ........... 53/479, 469, 374.6, 373.7; 156/308.4
See application file for complete search history.

(56) References Cited

OTHER PUBLICATIONS

English translation of the Search Report received in EP 15180151.1 and dated Jan. 11, 2016.

\* cited by examiner

SEALING STATION FOR SEALING OF FILM BAGS AND CORRESPONDING METHOD

CROSS-REFERENCE TO RELATED APPLICATIONS

This application claims the benefit of priority to European Patent Application No. 15180151.1, filed Aug. 7, 2015, which is incorporated by reference herein in its entirety.

BACKGROUND

Film bag sealing apparatuses for sealing of filled film bags are known, which comprise a support device and a sealing station. To bring the sealing station for a sealing process into the upper area of the film bags that are arranged under it by means of the support device, the sealing station is moved by means of a rack with a knee switch and a pressurized air spring in relation to the support device. The contact pressure of the sealing station onto the film bag halves to be sealed is also formed by means of the rack with the knee switch and pressurized air spring. The pressurized air spring hereby limits the maximum applied force of the contact pressure in the dead center of the knee switch.

Through the large masses of rack, knee switch and pressurized air spring that need to be moved, there will be a limitation with regard to the machine speed and hence of the number of film bags that can be sealed per time unit, and also with regard to the positioning accuracy. In addition, the contact pressure cannot be monitored and/or controlled accurately, which can lead to increased wear of the support device and the sealing station. Also, there may be very long setting times of the racks after maintenance works on the film bag sealing apparatus. Besides, no sufficient flexibility with regard to sealing of different film bag types, e.g. with different formats, is ensured during use of such a film bag sealing apparatus.

SUMMARY

The present invention provides, in various embodiments, a sealing station for sealing of filled film bags and a corresponding method that allows an increased throughput and a more wear-free operation of the sealing station.

In some embodiments, the invention provides a sealing station in a film bag filling device for sealing of film bags after a filling process. The sealing station comprises a first sealing arm and a second sealing arm for sealing of two or more filled film bags that are arranged next to one another. The first sealing arm is moveable with a first drive shaft and the second sealing arm is moveable with a second drive shaft. A servo engine is disposed on the first drive shaft and a drive movement of the first drive shaft is transferred from a first gear wheel to a second gear wheel that encroaches in the first gear wheel and from the second gear wheel to the second drive shaft.

In some embodiments, the sealing arms comprise sealing bars configured for ultrasound sealing.

In some embodiments, the sealing arms are configured to apply a contact pressure in a closed state.

In some embodiments, the sealing station further comprises a measurement and control device for a current of the servo engine.

In some embodiments, the measurement and control device is configured to control the contact pressure based on type information of the film bags by means of the current of the servo engine.

In some embodiments, the sealing station further comprises a film bag transport device.

In some embodiments, the invention provides a method for sealing of film bags after a filling process using the sealing station of claim 1, the method comprising positioning the filled film bags below the sealing station, closing the sealing arms and applying a contact pressure with a first value; and sealing the filled film bags.

In some embodiments, the contact pressure is increased to a second value during sealing.

In some embodiments, the method further comprises opening the sealing arms after the sealing step.

In some embodiments, removal of the sealed film bags takes place after the method is completed.

In some embodiments, the method further comprises at least one of entering type information of the film bags into a data memory and reading of type information of the film bags out of a data memory; calculating a set current of the servo engine based on the type information by means of a measurement and control device; and controlling the servo engine in accordance with the calculated set current.

DETAILED DESCRIPTION

Figure 1:
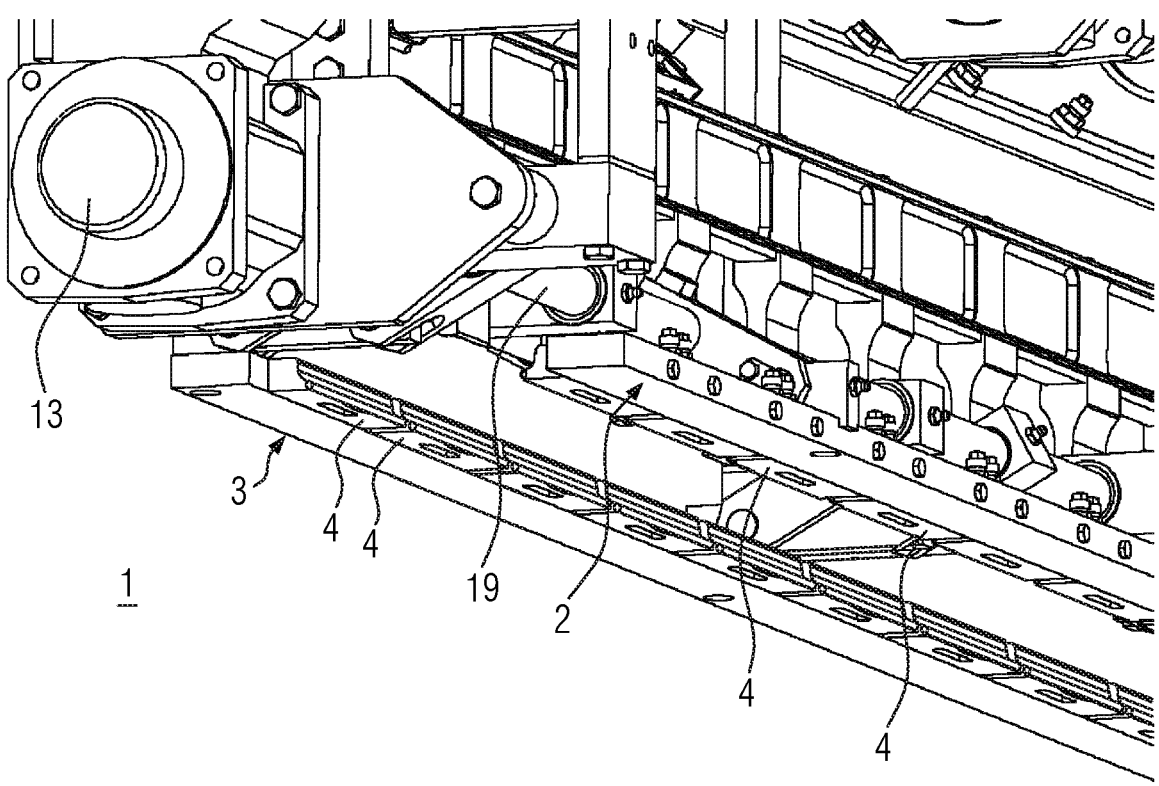
FIG. 1 shows a perspective view of an open sealing station in a first viewing direction from below at an angle.

The sealing station in a film bag filling apparatus for sealing of film bags after a filling process comprises a first and a second sealing arm for sealing of several filled film bags that are arranged next to one another, wherein the first sealing arm can be moved with a first drive shaft and the second sealing arm with a second drive shaft. A servo engine is disposed on the first drive shaft, and a drive movement of the first drive shaft is transferred from a first gear wheel to a second gear wheel that encroaches in the first gear wheel and from the second gear wheel to the second drive shaft. In addition, the two sealing arms can be designed in a closed state to hold the filled film bags for and/or during the sealing process.

Through the use of a servo engine that is arranged directly on a drive shaft, the racks, the pressurized air spring and the knee switch required in the state of the art can be omitted. Hence, the sealing station according to the invention has a lower mass compared to a sealing station of the state of the art so that a higher operating speed is possible. In addition, long setting times after maintenance of the sealing station are no longer required.

Through the arrangement of the servo engine on the first drive shaft, a direct impact of the servo engine on this drive shaft is possible by means of which accuracy in positioning of the sealing arms is ensured. Therefore, signs of wear of the sealing arms and damages of the film bags in the area to be sealed can be minimized as for example the contact pressure of the two sealing arms can be adapted to types of the film bags and/or to the point in time during the sealing process.

A film bag can respectively be a bag that is open in an upper area, i.e. that the two film halves of the film bag do not have a fixed, connecting contact in this upper area. This upper area can be sealed by means of the sealing station after filling of the film bag with a filling product, e.g. with a liquid or chunky foodstuff or a liquid or chunky animal feed product, so that a fixed, connecting contact is formed between the two halves of the film bag.

Through the gear wheel drive with the two meshing gear wheels, the drive movement of the first drive shaft is transferred to the first gear wheel and from there to the second gear wheel and hence to the second drive shaft. As the first drive shaft is responsible for a drive movement of the first sealing arm and the second drive shaft for a drive movement of the second sealing arm, there is always a synchronous movement of the two sealing arms during opening and/or closing. Due to this arrangement of the sealing arms and the described drive, it is therefore possible to perform a rotary parallel movement so that the desired accurate performance of the movement and a control of the contact pressure of the two sealing arms can be ensured.

The sealing arms can comprise sealing bars, wherein the sealing bars are preferably designed for ultrasound sealing. Sealing with ultrasound enables a comparably fast sealing process.

In addition, the sealing arms can be designed to apply a contact pressure in a closed state. The strength of the contact pressure can be modifiable so that, besides the support of film bags, also a material thickness reduction in the area of the sealing seam can be accounted for during the sealing process.

The sealing station can further comprise a measurement and control device for a current of the servo engine. The measurement and control device enables measurement of the current that flows into the servo engine and/or control of the current so that it is possible to modify, i.e. to control, the current during, prior to or after a sealing process.

The measurement and control device can be designed to control the contact pressure of the sealing arms based on type information of the film bags such as film bag formats, filling volumes and/or film bag materials by means of the current of the servo engine. For this purpose, such a current can be calculated based on the type information. The calculated set current corresponds to a desired contact pressure that is to be applied by the sealing arms. The type information of the film bags can be entered into the measurement and control device and/or read in from a data memory. The data memory can be a part of the measurement and control device or the data memory can be a memory that is independent of said device.

It can be advantageous to increase the contact pressure if film bags are to be sealed whose film bag material has for example a higher thickness than previously sealed film bags or whose size, i.e. the format, is larger than previously sealed film bags. Accordingly, it can be advantageous to reduce the contact pressure if film bags are to be sealed whose film bag material has for example a lower thickness than previously sealed film bags or whose size, i.e. the format, is smaller than the one of previously sealed film bags.

The sealing station can further comprise a film bag transport device. With the film bag transport device, the filled film bags can be inserted in the sealing station for a sealing process and/or the sealed film bags can be led to further processes by means of the film bag transport device after finished sealing.

A method according to the invention for sealing of film bags after a filling process with a sealing station as described above or further below comprises the steps: positioning of the filled film bags below the sealing station; closing of the sealing arms and application of a contact pressure with a first value and sealing of the filled film bags. The contact pressure can be increased to a second value during sealing.

After the sealing step, opening of the sealing arms and subsequently removal of the sealed film bags can take place in order to use said film bags for further processes.

The method can comprise the further steps: entry of type information of the film bags and/or reading of type information of the film bags from a data memory; calculation of a set current of the servo engine based on the type information by means of a measurement and control device and control of the servo engine according to the calculated set current.

Figure 2:
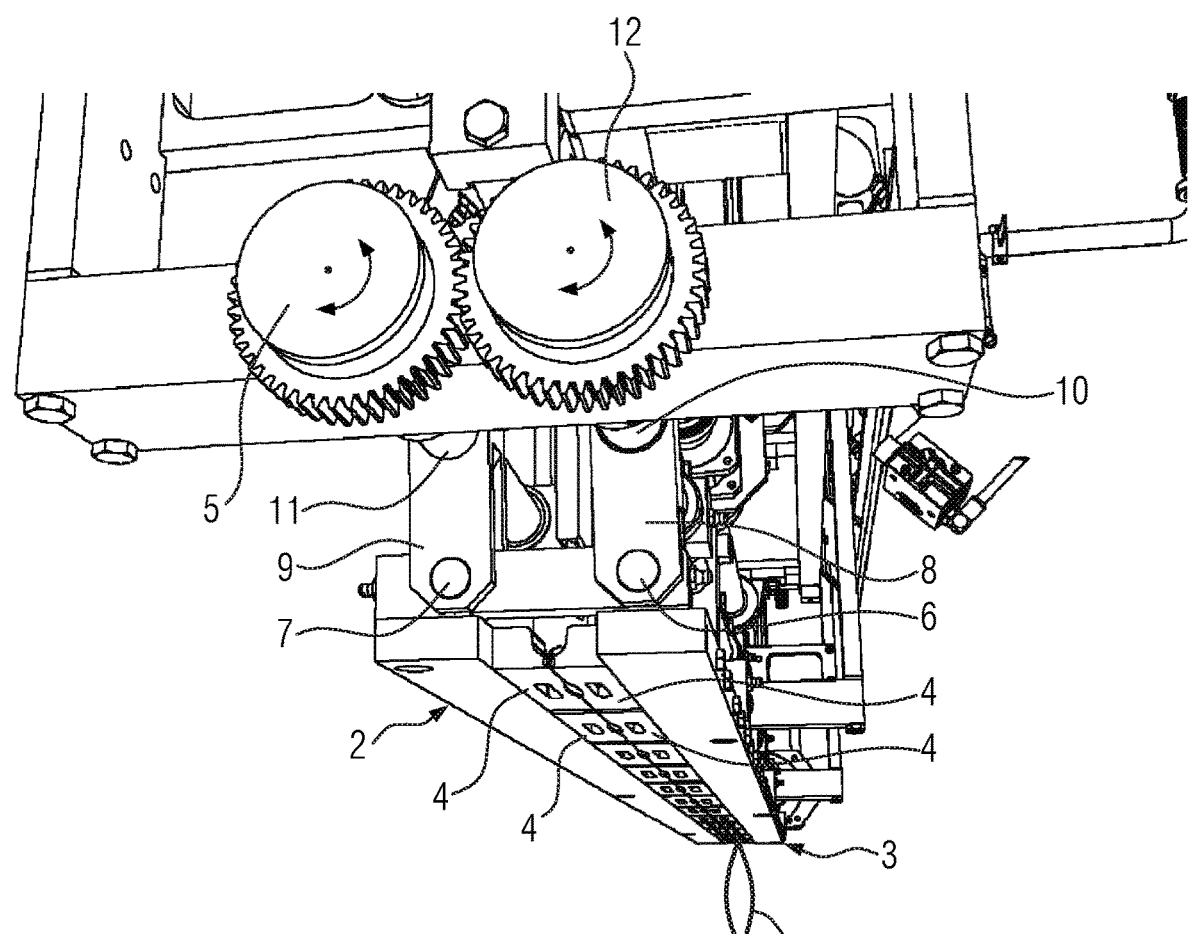
FIG. 2 shows a perspective view of the closed sealing station in a second viewing direction from below at an angle.
Figure 3:
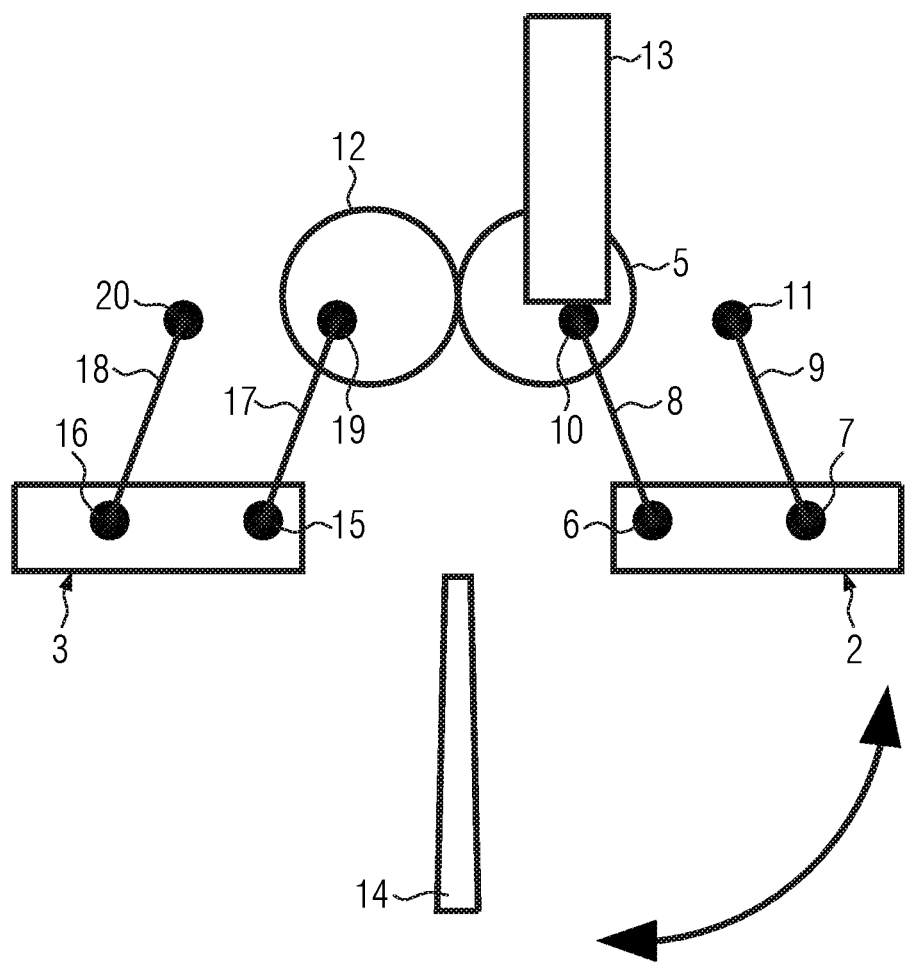
FIG. 3 shows a detail for movement of the two sealing arms.

The enclosed Figures show aspects of the invention in an exemplary way for better understanding and illustration. The Figures show:

FIG. 1 shows a perspective view of an open sealing station in a first viewing direction from below at an angle, FIG. 2 shows a perspective view of the closed sealing station in a second viewing direction from below at an angle and FIG. 3 shows a detail for movement of the two sealing arms.

FIG. 1 shows a perspective view of an open sealing station 1 in a first viewing direction at an angle from below the sealing station 1, so that the side of the sealing station 1 with the servo engine 13 can be seen. The sealing station 1 comprises two sealing arms 2, 3 that can be moved in relation to each other. The sealing arms 2, 3 are mirror-symmetric and respectively have, in the area in which they can be brought in contact when there are no film bags between them, several sealing bars 4 that are arranged next to one another along the sealing arm 2, 3 and that are used for supporting and sealing of filled film bags in a closed sealing station 1. In a filled, still open state, the film bags are led into the sealing station 1 with a film bag transport device (not shown), in which the film bags are in such an alignment in relation to the sealing station 1 that, during a closing process of the sealing arms 2, 3, the film bags can be held in an upper area between the respective sealing bars 4 and subsequently also sealed.

Opening and/or closing of the sealing arms 2, 3 takes place by means of the servo engine 13 that is disposed directly on a first drive shaft (not visible here; see FIG. 2). Through to this arrangement, a direct impact of the servo engine 13 on the first drive shaft 10 is possible due to which the movement of the two sealing arms 2, 3 can be controlled better and accuracy in positioning of the sealing arms 2, 3 is ensured. Therefore, signs of wear of the sealing arms 2, 3 and damages in the area of the film bags to be sealed can be minimized as for example the contact pressure of the two sealing arms 2, 3 can be adapted to types of the film bags and/or to the point in time during the first sealing process.

The first sealing arm 2 can be moved through the first drive shaft 10 on whose one end the servo engine 13 and on whose other end a first gear wheel 5 (not visible here; see FIG. 2) is arranged. The first sealing arm 2 has two axes 6, 7 (not visible here; see FIG. 2), wherein the first axis 6 is connected by means of a first rack 8 to the first drive shaft 10 and the second axis 7 by means of a second rack 9 to a third axis 11 that is parallel to the first drive shaft 10.

The second sealing arm 3 also has two axes 15, 16 (not visible here; see FIG. 3), wherein the first axis 15 is connected by means of a first rack 17 to the second drive shaft 19 and hence to a second gear wheel 12 (not visible here; see FIG. 2) and the second axis 16 is connected by means of a second rack 18 to a third axis 20 that is parallel to the second drive shaft 19 (not shown here; see FIG. 3).

FIG. 2 shows a perspective view of the closed sealing station 1 in a second viewing direction at an angle from below the sealing station 1 so that the side of the sealing station 1 with the two gear wheels 5, 12 can be seen. The two sealing arms 2, 3 were moved towards one another and the sealing station 1 was closed so that the sealing bars 4 are now in contact or so that between the sealing bars 4 the upper areas of the film bags to be sealed are clamped or held by them. Between the two sealing arms 2, 3, there is a contact pressure whose strength can be controlled by means of the servo engine 13.

The closing movement of the two sealing arms was performed by the gear wheel drive with the meshing first 5 and second gear wheels 12, wherein the movement of the first gear wheel 5 was transferred to the second gear wheel 12. Hence, a synchronous movement of the first 2 and the second 3 sealing arm took place during closing, starting from the servo engine 13 arranged on the first drive axis 10. A filled film bag 14, which is held and/or clamped between two sealing bars 4 of the sealing arms 2, 3, is shown as an example.

During the sealing process, the contact pressure of the two sealing arms 2, 3 can be increased by means of the servo engine 13, for example through monitoring and control of the power input of the servo engine 13; however, the contact pressure can also remain constant or be reduced. Through readjustment of the contact pressure of the two sealing arms 2, 3 by means of the servo engine 13 that is installed directly on the drive shaft 10, after the start of the sealing process, it can be ensured that the two film bag halves will continue to lie next to one another also in case of a potential material thickness reduction in the area of the sealing seam.

After the sealing process and opening of the sealing arms 2, 3, the sealed film bags 14 can be led to further processes by means of the film bag transport device.

FIG. 3 shows a detail regarding the movement of the two sealing arms 2, 3. In this schematic side view, the first 2 and the second sealing arm 3 as well as the first 5 and the second gear wheel 12 can be seen. The first sealing arm 2 can be moved by the first drive shaft 10 on whose one end the servo engine 13 and on whose other end the first gear wheel 5 is arranged. The first sealing arm 2 in addition has axes 6, 7, wherein the first axis 6 is connected by means of a rack 8 to the first drive shaft 10 and the second axis 7 by means of a rack 9 to a third axis 11 that is parallel to the first drive shaft 10.

The second sealing arm 3 also has two axes 15, 16, wherein the first axis 15 is connected by means of a rack 17 to the second drive shaft 19 and the second axis 16 by means of a rack 18 to a third axis 20 that is parallel to the second drive shaft 19.

Through this gear wheel drive with the two meshing gear wheels 5, 12, the movement of the first gear wheel 5 is transferred to the second gear wheel 12 and hence a drive movement of the first drive shaft 10, on which the servo engine 13 is arranged, is transferred to the second drive shaft 19. Therefore, there is always a synchronous movement of the first 2 and the second 3 sealing arm during opening and/or closing of the sealing station 1. Due to the displayed arrangement of the two sealing arms 2, 3, it is consequently possible to perform a rotary parallel movement so that the desired accurate performance of the movement and a control of the contact pressure of the two sealing arms 2, 3 can be ensured.

The invention claimed is:

1. A sealing station in a film bag filling device for sealing film bags after a filling process, the sealing station comprising:
   a first sealing arm and a second sealing arm for sealing two or more filled film bags that are arranged next to one another, each of the filled film bags being a bag that is open in an upper area, wherein the first sealing arm is moveable with a first drive shaft and the second sealing arm is movable with a second drive shaft, wherein the sealing arms each comprise several sealing bars that are arranged next to one another along the sealing arm; and
   a servo engine disposed on the first drive shaft, wherein a drive movement of the first drive shaft is transferred from a first gear wheel to a second gear wheel that encroaches in the first gear wheel, and from the second gear wheel to the second drive shaft;
   and the sealing arms being configured that during a closing process of the sealing arms, the filled film bags can be held in the upper area between the respective sealing bars and can subsequently be sealed in the upper area.

2. The sealing station of claim 1, wherein the sealing bars are configured for ultrasound sealing.

3. The sealing station of claim 1, wherein the sealing arms are configured to apply a contact pressure in a closed state.

4. The sealing station of claim 3, further comprising a measurement and control device for a current of the servo engine.

5. The sealing station of claim 4, wherein the measurement and control device is configured to control the contact pressure based on type information of the film bags by means of the current of the servo engine.

6. The sealing station of claim 1, further comprising a film bag transport device.

7. A method for sealing film bags after a filling process using the sealing station of claim 1, the method comprising:
   positioning of the filled film bags, each of the filled film bags being a bag that is open in an upper area, below the sealing station;
   closing the sealing arms, holding the filled film bags in the upper area between the sealing bars and applying a contact pressure having a first value; and
   sealing the filled film bags in the upper area.

8. The method of claim 7, further comprising increasing the contact pressure to a second value during the sealing.

9. The method of claim 7, further comprising opening of the sealing arms after the sealing.

10. The method of claim 7, further comprising removing the sealed film bags after the sealing.

11. The method of claim 7, further comprising:
   at least one of entering type information of the film bags into a data memory and reading type information of the film bags out of a data memory;
   calculating a set current of the servo engine based on the type information using a measurement and control device; and
   controlling the servo engine responsive to the calculated set current.

\* \* \* \* \*